United States Patent
Venkataraman

(10) Patent No.: US 8,977,628 B2
(45) Date of Patent: Mar. 10, 2015

(54) SYSTEMS, METHODS, AND COMPUTER-READABLE MEDIA FOR INNOVATION FARMING

(75) Inventor: Rajaram Venkataraman, Chennai (IN)

(73) Assignee: Infosys Limited, Bangalore (IN)

(*) Notice: Subject to any disclaimer, the term of this patent is extended or adjusted under 35 U.S.C. 154(b) by 140 days.

(21) Appl. No.: 13/342,425

(22) Filed: Jan. 3, 2012

(65) Prior Publication Data

US 2013/0024463 A1    Jan. 24, 2013

(30) Foreign Application Priority Data

Jul. 19, 2011 (IN) .......................... 2453/CHE/2011

(51) Int. Cl.
*G06F 17/30* (2006.01)
*G06Q 10/06* (2012.01)

(52) U.S. Cl.
CPC .................................... *G06Q 10/06* (2013.01)
USPC .................................. 707/748; 707/E17.058

(58) Field of Classification Search
USPC .............................. 707/748, 758; 705/37, 310
See application file for complete search history.

(56) References Cited

U.S. PATENT DOCUMENTS

| | | |
|---|---|---|
| 2002/0016727 A1 | 2/2002 | Harrell et al. |
| 2003/0139956 A1 | 7/2003 | Guenther et al. |
| 2004/0073443 A1* | 4/2004 | Gabrick et al. ................... 705/1 |
| 2005/0060213 A1 | 3/2005 | Lavu et al. |
| 2007/0276675 A1 | 11/2007 | Gabrick et al. |
| 2008/0109267 A1 | 5/2008 | DeLosa et al. |
| 2008/0215474 A1* | 9/2008 | Graham ........................ 705/37 |
| 2009/0326999 A1 | 12/2009 | Duke |
| 2010/0100491 A1* | 4/2010 | Frank et al. ................... 705/310 |
| 2011/0178836 A1 | 7/2011 | Seefeld et al. |
| 2011/0196713 A1 | 8/2011 | Boss et al. |
| 2011/0213728 A1 | 9/2011 | Rheaume |
| 2012/0174017 A1* | 7/2012 | Tidwell et al. ................ 715/772 |

* cited by examiner

*Primary Examiner* — Shyue Jiunn Hwa
(74) *Attorney, Agent, or Firm* — Marc S. Kaufman; Stephen M. Hertzler; Reed Smith LLP

(57) ABSTRACT

Systems, methods, and computer-readable code stored on a non-transitory media for assessing an entity's innovation level by one or more computing devices include gathering information relating to an entity's performance in plural disciplines; capturing strengths and opportunities of the entity based on the gathered information; generating an innovation score of the entity; analyzing the innovation score to generate an innovation report; and returning the innovation report to the entity.

15 Claims, 10 Drawing Sheets

| Levels\Spheres | Capability Sphere Context | Behavior Sphere Context | Outcome Sphere Context | Core Values | Remarks |
|---|---|---|---|---|---|
| Level 0 - Context | NA | NA | Some impacts due to Serendipitous innovation | NA | Usually the current state of any organization which has not instituted any formal innovation program |
| Level 1 - Context | Innovation Execution Process | | Consequence Metrics - 1 | Core value exhibition | Discipline/Act will be assessed and the score will get aggregated at Context level |
| | % | | % | % | |
| | Innovation Enablement | | | | Discipline/Act will be assessed and the score will get aggregated at Context level |
| | % | | % | % | |
| (Level 1 Scores) (average context score) | % | % | % | % | Discipline/Act will be assessed and the score will get aggregated at Context level |
| Level 2 - Context | Innovation Leadership & Organization | | Consequence Metrics - 2 | Core value exhibition | |
| | % | | % | % | |
| | Innovation Management | | | | Discipline/Act will be assessed and the score will get aggregated at Context level |
| | % | | | | |
| | Innovation Enablement | | | | Discipline/Act will be assessed and the score will get aggregated at Context level |
| | % | | | | |
| (Level 2 scores) (Average context score includes the previous contexts) | % | % | % | % | Discipline/Act will be assessed and the score will get aggregated at Context level |

| Sphere | Context | Discipline | Act |
|---|---|---|---|
| CAPABILITY | Innovation Leadership & Organization | Strategic Innovation | Innovation Vision & Inspiration |
| | | | Innovation Strategy |
| | | | Innovation Goals and Positioning |
| | | Innovation Environment | Stretch & Challenge |
| | | | Human Capital |
| | | | Structural Capital |
| | | | Social and Relationship Capital |
| | | Investments and Budgeting | |
| | | Branding and Communication | |
| | Innovation Management | Goals and Metrics | |
| | | Dynamic Capabilities | |
| | | Innovation Pipeline Management | |
| | | Innovation Process Effectiveness | |
| | Innovation Governance | Innovation Performance | |
| | | Predictability | |
| | | Sustainability | |
| | | Profitability | |
| | | De-risking | Risk Management |
| | | Diffusion | |
| | | IP Protection and Violation | |
| | Innovation Execution Process | Innovation Context | Inspiration, Scope, Challenge |
| | | Opportunity Identification | |
| | | Ideation | |
| | | Concept Definition | |
| | | Concept Evaluation & Selection | |
| | | Incubation | |
| | | Commercialization | |
| | | Post Commercialization Checkpoint Reviews | |
| | Innovation Enablement | Foundation | Time, Space |
| | | Diversity & Culture | |
| | | R & R | |
| | | Tools, Techniques, Platforms | |
| | | Workouts | |
| | Collaboration, Networks and Partnering | Knowledge, Collaboration and Partnering | |
| | | Ecosystem Creation and Nurturing | |
| | | Foresights and Insights | |

FIG. 2A

| Sphere | Context | Discipline | Act |
|---|---|---|---|
| BEHAVIOR | Feedback and Reflection | Self Introspection | |
| | | Customer Feedback | |
| | | Employee Feedback | |
| | | Internal Partners Feedback | |
| | | External Partners Feedback | |
| | | Media Feedback | |
| | | Innovation Champions Feedback | |
| | | Investor Feedback | |
| | Growth and Improvement Intensity | Innovation in Innovating | |
| | | Growth Mindset | |
| | | Adapting Rapidly (Agility) | |
| | | Learning and Improvisation | |
| | Sustainability | Identify and Break Barriers | |
| | | Strength Institutionalization & Culture | |
| OUTCOME | Impact Measures | Impact Measure 1 | |
| | | Impact Measure 2 | |
| | | Impact Measure 3 | |
| | | Impact Measure 4 | |
| | | Impact Measure 5 | |
| | | Impact Measure 6 | |

FIG. 2B

| Levels\Spheres | Capability Sphere Context | Behavior Sphere Context | Outcome Sphere Context | Core Values | Remarks |
|---|---|---|---|---|---|
| Level 0 - Context | NA | NA | Some impacts due to Serendipitous innovation | NA | Usually the current state of any organization which has not instituted any formal innovation program |
| Level 1 - Context | Innovation Execution Process | | Consequence Metrics - 1 | Core value exhibition | Discipline/Act will be assessed and the score will get aggregated at Context level |
| | % | | % | % | |
| | Innovation Enablement | | | | Discipline/Act will be assessed and the score will get aggregated at Context level |
| | % | | % | % | |
| (Level 1 Scores) (average context score) | % | % | % | % | |
| Level 2 - Context | Innovation Leadership & Organization | | Consequence Metrics - 2 | Core value exhibition | |
| | % | | % | % | |
| | Innovation Management | | | | Discipline/Act will be assessed and the score will get aggregated at Context level |
| | % | | | | |
| | Innovation Enablement | | | | Discipline/Act will be assessed and the score will get aggregated at Context level |
| | % | | | | |
| (Level 2 scores) (Average context score includes the previous contexts) | % | % | % | % | Discipline/Act will be assessed and the score will get aggregated at Context level |

FIG. 3A

| Levels\Spheres | Capability Sphere | | Behavior Sphere | Outcome Sphere | Core Values | Remarks |
|---|---|---|---|---|---|---|
| | Context | Context | Context | Context | | |
| Level 3 - Context | Innovation Governance | | Feedback and Reflection | Consequence Metrics - 3 | Core values exhibition | |
| | % | | % | % | % | |
| | Collaboration, Networking and Partnering | | | | | |
| | % | | | | | |
| (Level 3 scores) (Average context score includes the previous contexts) | % | | % | % | % | Discipline/Act will be assessed and the score will get aggregated at Context level |
| Level 4 - Context | All the above Contexts | | Growth mindset & Improvement Intensity | Consequence Metrics - 4 | Core values exhibition | |
| | % | | % | % | % | |
| (Level 4 scores) (Average context score including the previous contexts) | % | | % | % | % | Discipline/Act will be assessed and the score will get aggregated at Context level |
| Level 5 - Context | All the above Contexts | | Sustainability | Consequence Metrics - 5 | Core values exhibition | |
| | % | | % | % | % | |
| (Level 5 scores) (Average context score includes the previous contexts) | % | | % | % | % | Discipline/Act will be assessed and the score will get aggregated at Context level |
| Level 6 - Context | All the above Contexts | | All the above Contexts | Consequence Metrics - 6 | Core values exhibition | |
| | % | | % | % | % | |
| (Level 6 scores) (Average context score includes the previous contexts) | % | | % | % | % | Discipline/Act will be assessed and the score will get aggregated at Context level |

FIG. 3B

| Level 1 | Capability Sphere | Behavior Sphere | Consequence/ Outcome Sphere | Core Values | Total Score | Remarks (Strengths, Improvement Areas, Interesting Observations) |
|---|---|---|---|---|---|---|
| Weightage | 70% | 5% | 20% | 5% | | |
| Raw Score from Assessment | % | % | % | % | | |
| Computed Score L1 | =Weightage*Raw Score | =Weightage*Raw Score | =Weightage*Raw Score | =Weightage*Raw Score | =sum | The total score is the sum of the computed scores across the 3 spheres and the core values |

| Level 2 | Capability Sphere | Behavior Sphere | Consequence/ Outcome Sphere | Core Values | Total Score | Remarks (Strengths, Improvement Areas, Interesting Observations) |
|---|---|---|---|---|---|---|
| Weightage | 60% | 10% | 25% | 5% | | |
| Raw Score from Assessment | % | % | % | % | | |
| Computed Score L2 | =Weightage*Raw Score | =Weightage*Raw Score | =Weightage*Raw Score | =Weightage*Raw Score | =sum | The total score is the sum of the computed scores across the 3 spheres and the core values |

| Level 3 | Capability Sphere | Behavior Sphere | Consequence/ Outcome Sphere | Core Values | Total Score | Remarks (Strengths, Improvement Areas, Interesting Observations) |
|---|---|---|---|---|---|---|
| Weightage | 50% | 15% | 30% | 5% | | |
| Raw Score from Assessment | % | % | % | % | | |
| Computed Score L3 | =Weightage*Raw Score | =Weightage*Raw Score | =Weightage*Raw Score | =Weightage*Raw Score | =sum | The total score is the sum of the computed scores across the 3 spheres and the core values |

FIG. 4A

| Level 4 | Capability Sphere | Behavior Sphere | Consequence/ Outcome Sphere | Core Values | Total Score | Remarks (Strengths, Improvement Areas, Interesting Observations) |
|---|---|---|---|---|---|---|
| Weightage | 40% | 15% | 35% | 10% | | |
| Raw Score from Assessment | % | % | % | % | | |
| Computed Score L4 | =Weightage*Raw Score | =Weightage*Raw Score | =Weightage*Raw Score | =Weightage*Raw Score | =sum | The total score is the sum of the computed scores across the 3 spheres and the core values |

| Level 5 | Capability Sphere | Behavior Sphere | Consequence/ Outcome Sphere | Core Values | Total Score | Remarks (Strengths, Improvement Areas, Interesting Observations) |
|---|---|---|---|---|---|---|
| Weightage | 35% | 15% | 40% | 10% | | |
| Raw Score from Assessment | % | % | % | % | | |
| Computed Score L5 | =Weightage*Raw Score | =Weightage*Raw Score | =Weightage*Raw Score | =Weightage*Raw Score | =sum | The total score is the sum of the computed scores across the 3 spheres and the core values |

| Level 6 | Capability Sphere | Behavior Sphere | Consequence/ Outcome Sphere | Core Values | Total Score | Remarks (Strengths, Improvement Areas, Interesting Observations) |
|---|---|---|---|---|---|---|
| Weightage | 30% | 15% | 45% | 10% | | |
| Raw Score from Assessment | % | % | % | % | | |
| Computed Score L6 | =Weightage*Raw Score | =Weightage*Raw Score | =Weightage*Raw Score | =Weightage*Raw Score | =sum | The total score is the sum of the computed scores across the 3 spheres and the core values |

FIG. 4B

Criteria for IFM Assessment

Units applying for the IFM Assessment should respond to the following requirements.

Please number your response as per the numbering given below.

Sample Contexts

1. Leadership
   1.1. What is your Unit's Innovation related Vision / Mission and Strategy and what methods do you adopt to communicate and deploy the same ?
   1.2. How is the innovation Strategy aligned / linked with Unit's business and Organization's business strategy ?
   1.3.
2. Innovation Budgeting and Investments
   2.1. What type of financial investments and budgeting have been created for Innovation at various levels ?
   2.2. ........
3. Innovation Branding and Communication
   3.1. What kind of communication mechanisms are used to reach people across the geographies to get the importance and expectation on innovation ?
   3.2. What kind of branding has been developed to project the innovations to existing customers and potential markets ?
   3.3. ........
4. Innovation Governance
   4.1. How do you promote 'innovation democracy' where ideas can come from anybody, anywhere and anytime (both internally as well as externally) ?
   4.2. ........
5. Innovation Growth Mindset and Innovation Intensity
   5.1. How do you expand the limits and boundaries of your offering including the products/services performance
   5.2. ........
6. Innovation Sustainability
   6.1. What are the plans to focus / improve sustainability of Innovation impacts and efforts ?
7. Impact / Outcome Measure 1
   7.1. What are the lead indicators you have on innovation capability building ?

FIG. 5

SYSTEMS, METHODS, AND COMPUTER-READABLE MEDIA FOR INNOVATION FARMING

RELATED APPLICATION DATA

This application claims priority to Indian Patent Application No. 2453/CHE/2011, filed Jul. 19, 2011, which is hereby incorporated by reference in its entirety.

BACKGROUND

Business models have historically targeted quality and efficiency when deploying new products and systems. These models stress conformance with rigid business rules and strategies and leave innovation as the focus of only a few groups with little systemic process management. Such conventional business models lack formal mechanisms to embed innovation in the DNA of the organization through deployment of innovation related initiatives, assess the effectiveness of such initiatives empirically, and improve integration and institutionalization of such initiatives in a systematic fashion, thereby creating a sustained culture of innovation.

BRIEF DESCRIPTION OF THE DRAWINGS

FIG. 2A illustrates exemplary disciplines and acts that may be scored within the capability sphere.

FIG. 2B illustrates exemplary disciplines that may be scored in the behavior and outcome spheres.

FIGS. 3A and 3B illustrate exemplary assessment levels for innovation scoring.

FIGS. 4A and 4B show exemplary tables for determining weighted average scores for each innovation level.

FIG. 5 shows an exemplary innovation farming model assessment form.

Figure 1:
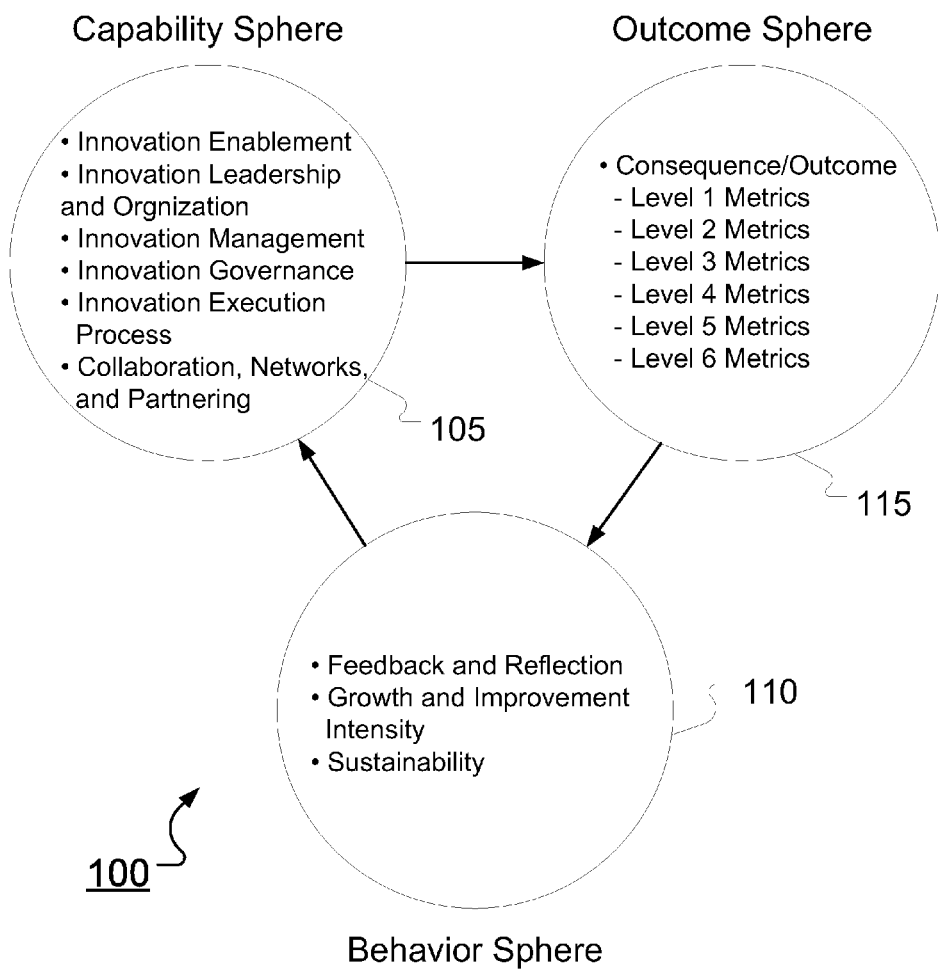
FIG. 1 shows an exemplary model for scoring the innovation level of an entity.

While systems, methods, and computer-readable media are described herein by way of examples and embodiments, those skilled in the art recognize that innovation farming is not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION

Disclosed embodiments provide systems, methods, and computer-readable media for innovation farming. The embodiments may provide frameworks and models for farming (i.e., growing, planting, nurturing, and harvesting) innovation across business entities or functions. Such frameworks may manage innovation as a core process, including setting improvement goals and priorities.

In contrast to conventional business models, modern technologies (e.g., the internet, social media, web 2.0 capabilities, etc.) provide for multiple touch points with customers that may be leveraged for various co-creation mechanisms to improve predictability and success-probability of innovation initiatives. In this current environment, a need exists to democratize and diffuse innovation across various business units, divisions, and organizations. Embodiments may provide systemic, repetitive, intuitive, and inclusive frameworks and models to provide a process flow leading to a higher level of innovation farming across an entity. Embodiments may provide for self-assessment of innovation farming with measurements provided for the various stages of innovation farming. Thus, embodiments may provide a layered approach to building innovation competencies, enabling behaviors, and related outcomes to improve innovation initiatives.

Innovation farming may mature from a low innovation farming level to higher innovation farming levels by iteratively and systematically improving core concepts necessary to achieve sustained and systemic innovation performance. To quantify maturity of innovation level farming, various innovation levels may be given scalar values. For example, seven levels of innovation farming may span from level 0 through level 6. Level 0, the least mature level, may be an as-is state. In other words, level 0 may be merely reactive with business units having no specific innovation training Because consistent processes, funding, or metrics for innovation may not exist at this level, the status quo with regard to products and services may be maintained and innovation may be slow and sporadic and hence may have poor innovation outcomes. Innovation may be considered as merely a nice improvement to a product or service and not a goal in and of itself.

As innovation matures across a business, innovation farming level 1 may be reached which may correspond to innovation tilling (i.e., preparing the environment for innovation to flourish). At this level, various initiatives may be taken to inspire people, build innovation capabilities, and prepare management process for pursuing innovation initiatives (i.e., initiatives with innovation itself being the goal rather than a specific product or service improvement being the goal). Further innovation maturity may lead to innovation farming level 2, manifested as innovation seeding. At this level, innovation initiatives may be launched. Innovation tools and techniques usage would be seen with increased participation at this level. Incremental innovation may be the predominant focus of this level.

Next, at innovation farming level 3 further innovation maturity may be manifested by innovation sprouting. At this level, benefits (e.g., innovative products and/or services, innovative efficiency improvements, etc.) may be observed as a result of innovation initiatives. At this level, co-creation with customers, partners, vendors, and the like may begin to sprout. As innovation maturity continues, at level 4 manifestations of maturity may be innovation flowering. At this level, a business may reap profits, increased market share, and the like based on innovations. At this level, several co-creation initiatives with customers, partners, employers and ecosystems may be contributing to innovation outcomes as well as the portfolio.

Further maturity may lead to innovation farming level 5 manifested by an innovation garden. At this stage the business may enjoy benefits of continued innovation across business organizations and may reap further benefits of the innovation, including improved branding and recognition for being an innovator in the field. Finally, a top innovation farming level 6 may be reached where the business is recognized as an innovation leader on the world stage. At this level, employees and business units may believe they can make a difference to the organization through innovative ideas, thus leading to consistent incubation of new innovations.

Of course, innovation farming may be broken down into more or less scalar levels with each level being manifested by observable success of innovation initiatives or observable steps taken toward pursuing innovation initiatives. For example, alternative embodiments may include three or ten innovation levels. At the lowest level, innovation may be merely serendipitous (e.g., by luck or accident) while at the highest level innovation may be ubiquitous (e.g., found everywhere based on building an environment that promotes innovation). The business culture at the lowest level usually may be one of obedience while at the highest innovation level the business culture may be one of passion where employees are inspired to innovate and try new things. At low levels, when innovations are implemented they may be by incremental evolution while at higher levels innovations may cause sweeping, transformatory changes. At lower levels a business may value innovation as a nice attribute for a business unit while at higher levels innovation may be the core goal of business units.

Business entities operating at lower innovation levels may satisfy stakeholders while business entities with higher innovation levels may consistently astonish stakeholders. This may be in part because at low innovation levels, business entities may be reactive to innovations by others while at higher innovation levels business entities may anticipate innovation and proactively pursue innovation to become an industry and global brand and thought leader. This also may cause business entities with low innovation levels to be thought of in the business community as mere commodities while business entities with high innovation levels may be differentiated from others in their technology space. The closed and protective nature of business entities with low innovation levels tends to lead to highly linear business trends and low predictability of success while the highly open and collaborative nature of business entities with high innovation levels tends to lead to non-linear business trends and a high degree of predictability of innovation success.

As these explanations of characteristics of low level innovation farming and high level innovation farming illustrate, rating the innovation level of an entity on a spectrum from low innovation levels to higher innovation levels may provide a view of the innovation strengths and weaknesses of the entity. While the above characteristics of low level innovation and high level innovation may be very helpful in assessing an entity's innovation level, they may be somewhat abstract to measure in practice. Thus, embodiments may score specific disciplines and acts for various contexts.

FIG. 1 shows an exemplary model 100 for scoring the innovation level of an entity. The model may be useful for determining the innovation level of an entity, analyzing innovation weaknesses of the entity, recommending innovation improvements for the entity, and gauging improvement progress for the entity. Model 100 separates the analysis of an entity's innovation level into three independent spheres, namely a capability sphere 105, an outcome sphere 115, and a behavior sphere 110. The interactions across these spheres may iteratively improve the innovation maturity of an entity.

Within each sphere there may be one or more contexts. For example, within the behavior sphere there may be a "feedback and reflection" context, a "growth and improvement intensity" context, and a "sustainability" context. Each context may then include one or more disciplines. For example, the "sustainability" context may include an "identify and break barriers" discipline and a "strengthen institutionalization and culture" discipline. Further, each discipline may be embodied in a combination of acts. For example, the "identify and break barriers" discipline may include a process barrier elimination act, a silos/structure barrier act, a finance/budget barrier act, and an infrastructure/environment barrier act. Likewise, the "strengthen institutionalization and culture" discipline may include a celebrative rest and recuperation on success and failure act, a communicate and brand innovation success internally/externally act, an engaging communities and leveraging diversity act, and a multi-dimensional innovation stretch act.

Of course, embodiments may include other contexts, disciplines, and acts within each sphere. For example, FIG. 2A illustrates exemplary disciplines and acts that may be scored within the capability sphere. Likewise, FIG. 2B illustrates exemplary disciplines that may be scored in the behavior and outcome sphere. While several disciplines illustrated in FIGS. 2A and 2B do not include corresponding acts, embodiments may include one or more acts within each discipline.

FIG. 1 additionally illustrates metrics levels 1 through 6 for scoring consequences/outcomes and FIG. 2B illustrates impact measures 1 through 6 as disciplines to be scored under the outcome sphere. The numerical levels of these metrics may correspond to the various farming levels described above. The various levels are meant for capturing and/or reporting impact metrics and may help in the assessment of outcomes of the various levels. In other words, the outcome metrics scored may correspond to the current innovation farming level of the entity. At each farming level, the metric may be a mixture of input measures, in-process measures, outcome measures, sustainability measures, and the like.

By assessing and scoring spheres, contexts, disciplines, and acts, embodiments may accurately gauge concrete innovation performance characteristics of the entity. Embodiments may follow an Approach, Core Values manifestation, Embedment, and Innovation Introspection and Integration ("ACE-I3") assessment strategy for assessing the spheres, contexts, disciplines, and acts. Under the "Approach" aspect of the ACE-I3 strategy, the assessor may look at how the entity or unit approaches the various spheres, contexts, disciplines, and/or acts. This may include, for example, assessing whether the approach taken by the entity has been creative and systematic (e.g., the newness of the approach, whether the approach includes repeatable steps, inputs and outputs, specific activities involved, timeframes, roles, responsibilities, etc.), assessing any evidence of the effectiveness of the approach, assessing the relevance of the approach to the entity's business goals, assessing whether the approach contributes to the entity's innovation performance, and the like.

Under the "Core Values manifestation" aspect of the ACE-I3 strategy, the assessor may assess the strength of the innovation core values of the entity. The core values may provide for a subjective assessment of the innovation strength of the entity within the entity's current innovation level. The core values score may, for example, be provided by an assessor who specializes in innovation growth. The assessor may base their determination subjectively on a write-up provided by the entity showing their self assessed innovation level, based on observed exhibition of core values by the entity, based on discussions between the assessor and key employees in the unit(s) of the entity being assessed, and the like. The core values score may, for example, receive a score between 80-100% corresponding to very strong (innovation program for the current innovation farming level), 60-80% corresponding to strong, and so on for medium, weak, and very weak.

Under the "Embedment" aspect of the ACE-I3 strategy, the assessor may assess the relevance, consistency, embeds flexibility, coverage, breadth (e.g., breadth across geographic areas and across groups/units of the entity), depth (e.g., at multiple levels of the entity), and the like. In other words, the assessor may assess the extent to which innovation is embedded in the culture of the entity.

Under the "Innovation Introspection" aspect of the ACE-I3 strategy, the assessor may assess the extent to which the entity learns through research and development, experimentation, prototyping, improvement cycles, iterative processes, and the like. The assessor may extrapolate trends and weak signals based on their observations regarding how the entity harmonizes innovation with their research and development and the like.

Under the "Integration" aspect of the ACE-I3 strategy, the assessor may assess how the introspection outcomes/insights have been integrated into the core innovation processes. The assessor may look to how the entity employs systems relating to diffusion of communication, feedback loops, resourcing plans, decisions, analysis, outcomes, goals, and the like to improve overall innovation performance.

While some embodiments may score all of the spheres, contexts, disciplines, and acts shown in FIGS. 2A and 2B at each innovation farming level, alternative embodiments may only score certain contexts, disciplines, and acts at each level that may be particularly relevant to the current farming level of the entity currently being scored. FIGS. 3A and 3B illustrate exemplary assessment levels for innovation scoring. As shown in FIG. 3A, at farming level 0 no scores may be measured because the entity likely has not instituted any formal innovation program. However, for an entity at context level 1, disciplines and acts in both the innovation execution process context and the innovation enablement context may be scored under the capability sphere, and the consequence metrics level 1 may be scored under the outcome sphere. Each of the contexts and consequence metrics may be scored on a set scalar scale, such as a scale of 1 through 100 which is represented by the '%' symbol in FIGS. 3A and 3B. The score for a given context may be a percentage score based on an average of the scores of disciplines and acts within the context. In some cases, the average may be a weighted average if certain disciplines and/or acts are deemed more representative than others, for example, based on the current innovation level of the entity.

FIGS. 3A and 3B go on to show the various contexts and metrics that may be scored for the entity once it reaches higher innovation levels. As shown, additional contexts may be scored as the entity advances in levels. Likewise, consequence metrics catered specifically to the current innovation level of the entity may be scored.

To determine a total score for each innovation level, a weighted average may be taken from the scores calculated for the three spheres and for the core values at each level. For example, the total score for each innovation level may be calculated based on the level scores determined according to FIGS. 3A and 3B. FIGS. 4A and 4B show exemplary tables for determining weighted average scores for each level. For example, at level 1 the score from the capability sphere may have a 70% weight, the score from the behavior sphere may have a 5% weight, the score from the consequence/outcome sphere may have a 20% weight, and the score from the core values may have a 5% weight. By multiplying the raw score for each sphere and the core values by the weightage for the level, a weighted score for each sphere and the core values may be calculated. The weighted scores may then be summed to arrive at the total score.

As FIGS. 4A and 4B illustrate, as an entity progresses to higher innovation farming levels, the weighting of the spheres and core values may progressively shift away from the capability sphere and more toward the behavior sphere, the consequence/outcome sphere, and the core values. At each level, general and/or specific recommendations for improvement may be made based on the scores for the spheres and core values. Once an entity receives a total score above a first threshold value (e.g., 60%), the entity may be eligible to be promoted to a higher innovation farming level for future measurements and scoring. Similarly, if an entity receives a score below a second threshold value (e.g., 35%), the entity may be demoted to a lower innovation farming level for future measurements and scoring.

Considering FIGS. 3A, 3B, 4A, and 4B in conjunction, some embodiments may not score contexts in each sphere for one or more levels. For example, as described above and shown in FIG. 3A, at innovation farming level 1 embodiments may not score any contexts in the behavior sphere. In such embodiments, the weighted score may have a maximum total score of 95% (comprising the 70% capability sphere score, 20% consequence/outcome sphere, and 5% core values). In such embodiments, the threshold value for fulfilling the current maturity level targeted may remain the same (e.g., 60%). In still other embodiments, a lower first threshold value (e.g., 55%) may be determined for promoting the entity to the next innovation farming level.

An entity to have their innovation assessed and scored may submit a unit profile, a response to an assessment questionnaire for the targeted maturity level, and an action taken report (e.g., if applying for reassessment to the targeted maturity level) to the assessor to assist with assessing and scoring the spheres, contexts, disciplines, and acts. A unit profile may be a profile submitted by one or more units of an entity highlighting specifically innovation related aspects of their business. The unit profile may include the nature of the business the unit and/or entity is in, their business strategy, vision, mission, values, three-to-five year business plan, revenue and cost segmentation for products, services, and others, employee segmentation and diversity by roles, geographic areas, qualification, gender, and competencies, innovation strategy (if available), exhibition of core values from IFM (if applicable), recruitment strategy, marketing strategy, operational systems and metrics, major challenges and threats for the unit or function, opportunities available, and the like. The unit profile may take any form, for example it may be a free texts (e.g., prose) description of innovative aspects of their business but may be limited to a concise length (e.g., 20 pages).

An assessment questionnaire may provide questions to one or more units of an entity applicable to the current innovation farming level targeted for assessment. FIG. 5 shows an exemplary innovation farming model assessment form (i.e., an exemplary assessment questionnaire). The unit(s) of the entity may answer questions relating to various contexts. The answers may provide data for the basis of an assessor to assess the entity using the ACE-I3 assessment strategy described above. Thus, questions, and an entity's responses, may be directed toward how the entity approached innovation, how core values of the model are manifesting, and how the entity has embedded innovative capabilities, behaviors, and outcomes in their business. The questions and responses may also provide innovative introspection and integration analysis regarding the entity's systems and processes. The responses to the outcome/consequence metrics may additionally include data over a span of time, for example trending data or graphs plotting data across plural quarters. This data may assist with showing innovative trends, which may be especially useful for assessing performance at higher innovation farming levels. Of course, measurements may be taken in alternative fashions to receive data for scoring the various spheres.

For entities that had previously been scored below the threshold level and hence are being reassessed for the same innovation farming level, the entity may also submit to the assessor an action taken report. The report may set forth the innovation contexts previously targeted in an assessment as well as specific steps taken to actively improve on the targeted areas based on the assessor recommendations and observations (e.g., strength, weakness, and improvement areas).

The entity may then be scored according to the ACE-I3 assessment strategy described above. A team of qualified assessors may assess each entity. These teams may be directly involved with providing comprehensive feedback (e.g., a feedback report) that may include strengths, targeted areas for improvement, and scores. In this process, each assessor (or assessment team) may interview key members of the entity and/or a random selection of employees having any role and from any location within the entity at some point before finalizing the comprehensive feedback.

Figure 6:
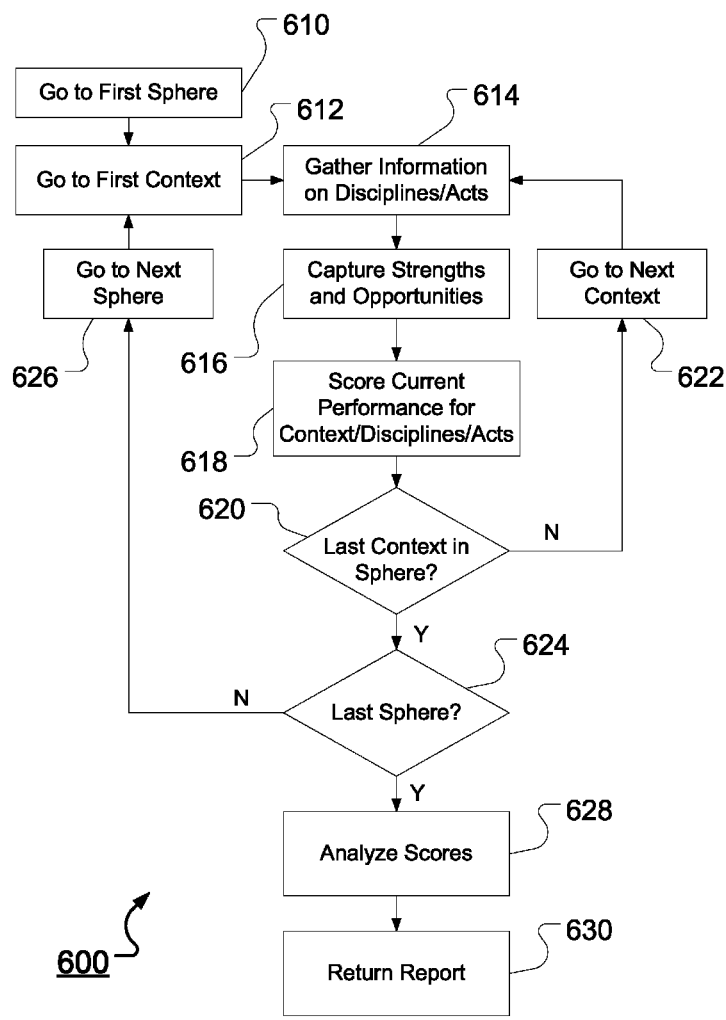
FIG. 6 shows an exemplary process flow for one or more computing device to gather information regarding the performance of an entity and generate an innovation score for the entity.

FIG. 6 shows an exemplary process flow 600 for one or more computing device to gather information regarding the performance of an entity (e.g., an organization, a person, a division of an entity (e.g., a business unit, a department, etc.)) with regard to various disciplines and acts making up the disciplines and generate a score for the entity. The process flow may take measurements relating to each sphere shown in model 100, for one or more contexts within each sphere, and for one or more acts making up one or more disciplines within each context. Measurements may include not only outcome fulfillment, but also consistency through trending over time (e.g., over plural quarters), subjective ratings on how a discipline and act has been approached and embedded, how the inspection and integration process has been put into effect, and the like. At a particular innovation farming level, there may be multiple iterations of measuring and/or assessing.

At step 610, a process may start at a first sphere from data model 100. The first sphere may be, for example, chosen randomly from the capability sphere 105, the behavior sphere 110, and the outcome sphere 115. At step 612, the process may proceed to a first context within a sphere of data model 100. For example, the process flow may proceed to the sustainability context of behavior sphere 110. At step 614, the process may gather information on various disciplines within the context and acts making up the disciplines. For example, within the sustainability context information may first be gathered regarding a strengthen institutionalization and culture discipline. Gathering information about this discipline may include gathering information regarding specific acts, such as a celebrative rest and recuperation on success and failure act. For example, if an entity rewards employees who have innovative ideas or who implement innovative improvements in the workplace with extra leave time or similar benefits, the act may be scored highly because it promotes innovation. Alternatively, if the entity provides no incentives to innovation drives, the act may receive a low score because it promotes maintaining the status quo. Similar steps may be performed for plural acts within a discipline and for plural disciplines within the context.

At step 616, the process flow may capture strengths and opportunities for disciplines and/or acts. For example, if the celebrative rest and recuperation on success and failure act receives a high score, the score may capture the act as an innovation strength for the entity. Similarly, if the engaging communities and leveraging diversity act receives a low score, the score may capture the act as an opportunity for improvement (e.g., a co-creation system may be implemented to better engage the community of stakeholders in innovative developments). At step 618, the score for the context may be determined based on its component discipline(s) and each discipline's component act(s). At step 620, the process may determine if the context scored in step 618 is the last context in the sphere of data model 100. If the context is not the last context, the process flow may proceed to step 622 and go to the next context. Steps 614 through 622 may be iterated until a requisite number of contexts within a sphere of data model 100 are scored. If it is determined at step 620 that the last context in the sphere has been scored, the process may proceed to step 624 to determine if the last sphere has been scored. If the last sphere has not been scored, the process may proceed to step 626 and advance to the next sphere. Steps 612 through 626 may then be iteratively repeated until all spheres in data model 100 have been measured and scored.

In some embodiments, all spheres, contexts, disciplines, and acts may be scored. For example, all contexts, disciplines, and acts shown in FIGS. 2A and 2B may be scored. In other embodiments, only certain spheres, contexts, disciplines, and acts may be scored. For example, scoring may take place along the lines of the discussion of FIGS. 3A and 3B above. Some embodiments may also score the core values of the entity at one or more of the levels.

Once the requisite numbers of spheres, contexts, disciplines, and acts have been scored, the process may proceed to step 628. At step 628 the scores may be analyzed. This step may include, for example, assessing a current innovation farming level for the entity. For example, the entity may be determined to be at an innovation seeding level. At this step the process may also assess recommendations for innovation improvement for the entity. The recommendations may be specific to the innovation level the entity is determined to be at. The recommendations may be general, such as directing the entity's attention to innovation contexts that could use improvement. Alternatively recommendations may be specific, for example suggesting one or more concrete steps that may be taken to improve on a specific act. Embodiments may also provide plural recommendations, which may include at least one of a specific recommendation and a general recommendation.

Step 628 may also prepare one or more reports of the innovation performance of the entity. For example, a report may provide a landscape corresponding to the populated data model 100 showing an entity's innovation strengths and weaknesses. Such a report may also indicate the innovation farming level and assessed recommendations for advancing to higher innovation farming levels. At step 630, the report may be returned to the entity. The report may be, for example, a written enumeration of scores (e.g., consolidated scores, individual scores for specific acts, scores for behaviors, or any combination of scores) which may include recommendations for innovation improvement and an explanation of the current innovation farming level of the entity. The report may be primarily a textual report (e.g., an email, webpage, or document), a numerical report (e.g., a spreadsheet), a combination thereof, or any other method of providing scores, metrics, and/or recommendations to an entity.

While process flow 600 as shown iteratively repeats plural steps, in alternative embodiments one or more steps may be performed in different orders or plural steps may be performed in parallel. Additionally, while process flow 600 is generally described with regard to data model 100, in alternative embodiments scores may be gathered and assessed with regard to only a portion of data model 100 or data model 100 may be modified for the specific technology space in which an entity wishes to innovate.

Data gathering, scoring, and assessing in process flow 600 may be performed in an automated fashion, for example utilizing artificial intelligence, fuzzy logic, lookup tables, and the like. Alternatively, these tasks may be performed manually, for example by one or more analysts. Embodiments may take a hybrid approach utilizing both aspects of automated data gathering, scoring, and assessing and aspects of manually performing the same steps. For example, manual review may be triggered if a threshold confidence level for any step of the process flow 600 is not satisfied.

Over time, by implementing recommendations according to embodiments, an entity may develop more mature innovation levels. Thus, an entity may move from one innovation farming level to a higher innovation level by demonstrating solid capabilities mandated for that level, including key behaviors and robust and measurable outcomes.

Embodiments may, thus, allow for entities to improve their innovation levels. By providing entities with reports of their current innovation levels and recommendations for improvement, entities may self-assess themselves in view of the empirical evidence from the report. The self-assessment may include realizing the entities innovation farming level based on the competencies and behaviors observed. At the enterprise level, this model and process may help employ systematic improvements in innovation farming to lead to highly mature innovation behaviors and a strong innovation pipeline. This may lead to improved predictability, reduced risk, and improved economics of innovation. These characteristics, in turn, can delight and astonish stakeholders.

Figure 7:
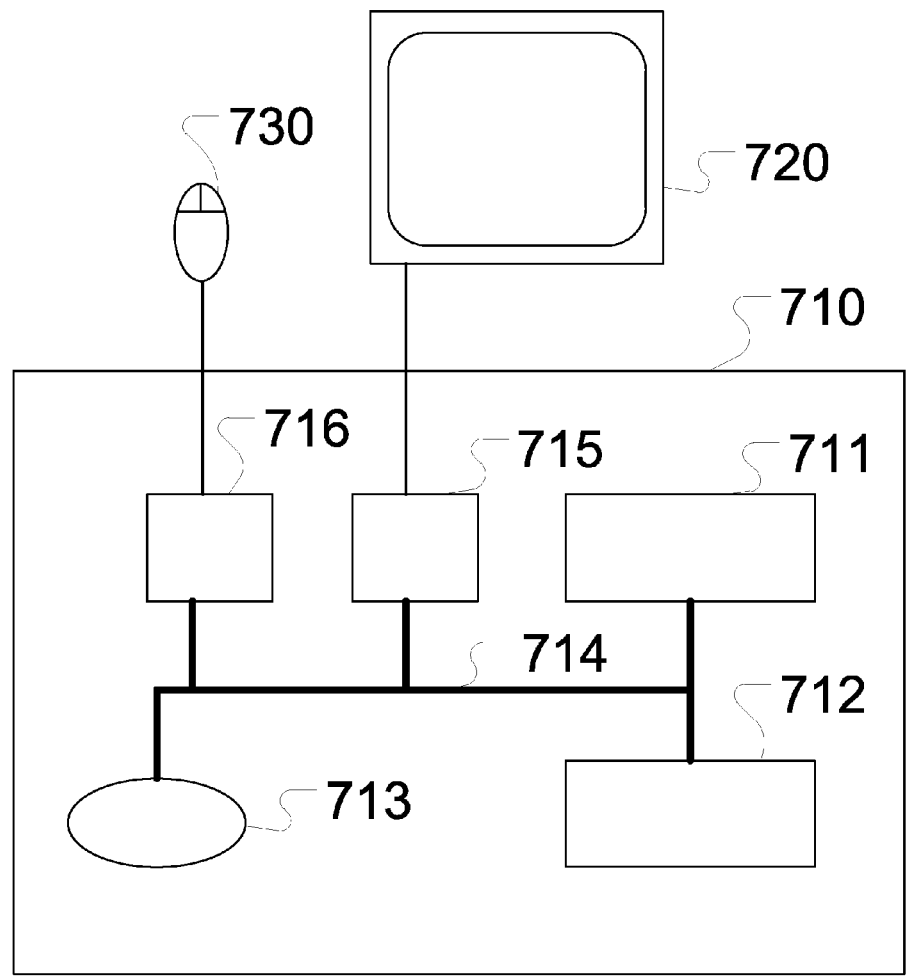
FIG. 7 shows an exemplary computing device useful for performing processes disclosed herein.

These embodiments may be implemented with software, for example modules executed on computing devices such as computing device 710 of FIG. 7. Of course, modules described herein illustrate various functionalities and do not limit the structure of any embodiments. Rather the functionality of various modules may be divided differently and performed by more or fewer modules according to various design considerations.

Computing device 710 has one or more processing device 711 designed to process instructions, for example computer readable instructions (i.e., code) stored on a storage device 713. By processing instructions, processing device 711 may perform the steps and functions disclosed herein. Storage device 713 may be any type of storage device (e.g., an optical storage device, a magnetic storage device, a solid state storage device, etc.), for example a non-transitory storage device. Alternatively, instructions may be stored in one or more remote storage devices, for example storage devices accessed over a network or the internet. Computing device 710 additionally may have memory 712, an input controller 716, and an output controller 715. A bus 714 may operatively couple components of computing device 710, including processor 711, memory 712, storage device 713, input controller 716, output controller 715, and any other devices (e.g., network controllers, sound controllers, etc.). Output controller 715 may be operatively coupled (e.g., via a wired or wireless connection) to a display device 720 (e.g., a monitor, television, mobile device screen, touch-display, etc.) in such a fashion that output controller 715 can transform the display on display device 720 (e.g., in response to modules executed). Input controller 716 may be operatively coupled (e.g., via a wired or wireless connection) to input device 730 (e.g., mouse, keyboard, touch-pad, scroll-ball, touch-display, etc.) in such a fashion that input can be received from a user.

Of course, FIG. 7 illustrates computing device 710, display device 720, and input device 730 as separate devices for ease of identification only. Computing device 710, display device 720, and input device 730 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 710 may be one or more servers, for example a farm of networked servers, a clustered server environment, or a cloud network of computing devices.

While innovation levels are described by way of metaphor to farming levels herein, those of skill in the art understand that innovation is not necessary related to farming. Rather, the farming level metaphor illustrates progression from entities that lack innovation maturity to those companies that are highly mature with regard to innovation. Additionally, the farming metaphor illustrates that a company cannot simply implement specific changes to progress directly from an immature innovation entity to a mature entity like a farmer cannot progress directly from preparing to plant seeds to harvesting. Rather, specific steps must be taken to progress. Embodiments provide various functions and analytics to determine a current innovation level and to provide innovation recommendations to an entity to facilitate innovation maturity.

Embodiments have been disclosed herein. However, various modifications can be made without departing from the scope of the embodiments as defined by the appended claims and legal equivalents.

What is claimed is:

1. A computer-implemented method executed by one or more computing devices for assessing an innovation farming level of an entity, said method comprising:

gathering, by at least one of the one or more computing devices, information relating to a capability sphere of the entity, wherein the capability sphere includes one or more categories that correspond to one or more capabilities of the entity and wherein in the information is gathered through interaction with the entity;

gathering, by at least one of the one or more computing devices, information relating to a behavior sphere of the entity, wherein the behavior sphere includes one or more categories that correspond to one or more behaviors of the entity and wherein the information is gathered through interaction with the entity;

gathering, by at least one of the one or more computing devices, information relating to an outcome sphere of the entity, wherein the outcome sphere includes one or more outcome metrics associated with the entity and wherein the information is gathered through interaction with the entity;

determining, by at least one of the one or more computing devices, one or more strengths and one or more improvement opportunities of the entity based at least in part on the gathered information;

generating, by at least one of the one or more computing devices, one or more scores for the capability sphere of the entity, the behavior sphere of the entity, and the outcome sphere of the entity based at least in part on the gathered information;

gathering, by at least one of the one or more computing devices, trending information reflecting a chance in the one or more scores over time;

generating, by at least one of the one or more computing devices, a report based on at least one of (i)the one or more strengths, (ii) the one or more improvement opportunities, (iii) the one or more scores, or (iv) the trending information, wherein the report includes an assessed innovation farming level of the entity; and transmitting, by at least one of the one or more computing devices, the report to the entity.

2. The method of claim 1, wherein generating a report comprises:

assessing the innovation farming level of the entity; and generating one or more recommendations for the entity to mature to a higher innovation farming level, wherein the one or more recommendations are based on the assessed innovation farming level of the entity.

3. The method of claim 1, wherein the gathered information includes information relating to one or more acts performed by the entity within each of one or more disciplines.

4. The method of claim 1, wherein the gathered information includes information relating to a performance of the entity in one or more contexts, wherein each context in the one or more contexts is comprised of one or more disciplines.

5. The method of claim 4, wherein each of the capability sphere, the behavior sphere, and the outcome sphere are comprised of one or more contexts.

6. A system for assessing an innovation farming level of an entity, said system comprising:

one or more processors; and one or more memories operatively coupled to at least one of the one or more processors and having instructions stored thereon that, when executed by at least one of the one or more processors, cause at least one of the one or more processors to:

gather information relating to a capability sphere of the entity, wherein the capability sphere includes one or more categories that correspond to one or more capabilities of the entity and wherein in the information is gathered through interaction with the entity;

gather information relating to a behavior sphere of the entity, wherein the behavior sphere includes one or more categories that correspond to one or more behaviors of the entity and wherein the information is gathered through interaction with the entity;

gather information relating to an outcome sphere of the entity, wherein the outcome sphere includes one or more outcome metrics associated with the entity and wherein the information is gathered through interaction with the entity;

determine one or more strengths and one or more improvement opportunities of the entity based at least in part on the gathered information;

generate one or more scores for the capability sphere of the entity, the behavior sphere of the entity, and the outcome sphere of the entity based at least in part on the gathered information;

gather trending information reflecting a change in the one or more scores over time;

generate a report based on at least one of (i) the one or more strengths, (ii) the one or more improvement opportunities, (iii) the one or more scores, or (iv) the trending information, wherein the report includes an assessed innovation farming level of the entity; and transmit report to the entity.

7. The system of claim 6, wherein generating a report comprises;

assessing the innovation farming level of the entity; and generating one or more recommendations for the entity to mature to a higher innovation farming level, wherein the one or more recommendations are based on the assessed innovation farming level of the entity.

8. The system of claim 6, wherein the gathered information includes information relating to one or more acts performed by the entity within each of one or more disciplines.

9. The system of claim 6, wherein the gathered information includes information relating to a performance of the entity in one or more contexts, wherein each context in the one or more contexts is comprised of one or more disciplines.

10. The system of claim 9, wherein each of the capability sphere, the behavior sphere, and the outcome sphere are comprised of one or more contexts.

11. At least one non-transitory computer-readable medium storing computer-readable instructions that, when executed by one or more computing devices, cause at least one of the one or more computing devices to:

gather information relating to a capability sphere of the entity, wherein the capability sphere includes one or more categories that correspond to one or more capabilities of the entity and wherein in the information is gathered through interaction with the entity;

gather information relating to a behavior sphere of the entity, wherein the behavior sphere includes one or more categories that correspond to one or more behaviors of the entity and wherein the information is gathered through interaction with the entity;

gather information relating to an outcome sphere of the entity, wherein the outcome sphere includes one or more outcome metrics associated with the entity and wherein the information is gathered through interaction with the entity;

determine one or more strengths and one or more improvement opportunities of the entity based at least in part on the gathered information;

generate one or more scores for the capability sphere of the entity, the behavior sphere of the entity, and the outcome sphere of the entity based at least in part on the gathered information;

gather trending information reflecting a change in the one or more scores over time;

generate a report based on at least one of (i) the one or more strengths, (ii) the one or more improvement opportunities, (iii) the one or more scores, or (iv) the trending information, wherein the report includes an assessed innovation farming level of the entity; and transmit report to the entity.

12. The at least one non-transitory computer-readable medium of claim 11, wherein generating a report comprises:

assessing the innovation farming level of the entity; and generating one or more recommendations for the entity to mature to a higher innovation farming level, wherein the one or more recommendations are based on the assessed innovation farming level of the entity.

13. The at least one non-transitory computer-readable medium of claim 11, wherein the gathered information includes information relating to one or more acts performed by the entity within each of one or more disciplines.

14. The at least one non-transitory computer-readable medium of claim 11, wherein the gathered information includes information relating to a performance of the entity in one or more contexts, wherein each context in the one or more contexts is comprised of one or more disciplines.

15. The at least one non-transitory computer-readable medium of claim 14, wherein each of the capability sphere, the behavior sphere, and the outcome sphere are comprised of one or more contexts.

* * * * *